United States Patent [19]

Melton et al.

[11] Patent Number: 4,570,152
[45] Date of Patent: Feb. 11, 1986

[54] MAGNETIC TIRE MONITOR SYSTEM

[75] Inventors: Jack D. Melton, Dallas; Collin J. McKinney, College Station; James A. Reimund, Bryan, all of Tex.

[73] Assignee: Hyperion Corporation, Richardson, Tex.

[21] Appl. No.: 603,103

[22] Filed: Apr. 23, 1984

[51] Int. Cl.[4] ............................................. B60C 23/00
[52] U.S. Cl. .................................. 340/58; 73/146.2; 200/61.22
[58] Field of Search ................. 340/58, 57; 73/146.5, 73/146.8, 146.2; 374/154, 153, 166, 167, 163; 324/207, 208, 234, 235, 233, 232, 236, 239; 200/61.22, 61.23

[56]  References Cited
U.S. PATENT DOCUMENTS

| | | | |
|---|---|---|---|
| 2,614,429 | 10/1952 | Welsh et al. | 73/349 |
| 3,575,054 | 4/1971 | Glista | 73/398 R |
| 3,738,175 | 6/1973 | Linsig | 73/362 CP |
| 4,246,567 | 1/1981 | Miller | 340/58 |
| 4,330,774 | 5/1982 | Doty | 340/58 |
| 4,334,215 | 6/1982 | Frazier et al. | 340/539 |

Primary Examiner—James L. Rowland
Assistant Examiner—Chi K. Lau
Attorney, Agent, or Firm—Hubbard, Thurman, Turner & Tucker

[57] ABSTRACT

A method and apparatus are described for monitoring the condition of a rotating pneumatic tire on a moving vehicle. A plurality of magnetic studs are embedded into the body of a pneumatic tire at the selected points about the periphery thereof. A magnetic field sensor is mounted upon a non-rotating portion of the vehicle adjacent to the tire and is utilized to detect the magnetic field pulsations generated by the rotating plurality of magnetic studs. As the temperature of the tire increases, toward imminent failure, or tread separation, the heat generated will decrease the magnetic field associated with the magnetic studs. When the temperature increases to a selected point and the magnetic field decreases accordingly, a display device is utilized to generate a visual and/or audible indication of imminent tire failure.

23 Claims, 3 Drawing Figures

MAGNETIC TIRE MONITOR SYSTEM

BACKGROUND OF THE INVENTION

This invention relates in general to systems for monitoring pneumatic tires on moving vehicles and in particular to systems which utilize magnetic fields to detect changes in the temperature of a rotating pneumatic tire.

The increasing costs associated with the purchase and maintenance of motor vehicles makes it important that these vehicles be maintained as well as possible. Further, the safety considerations necessary with the high speed of operation typically associated with highway travel dictate that the operator be aware at all times of situations which can suddenly and drastically affect the operation of his vehicle.

One subsystem within a modern automobile which must be constantly maintained at peak condition in order to maximize the efficiency and safety of a motor vehicle is the pneumatic tires which support the vehicle. Excessive heating and improper inflation of pneumatic tires has long been recognized as a possible serious safety problem due to the possibility of sudden tire or tread failure, giving rise to possible hazardous conditions. While the measurement of tire pressure and the observance of tire temperature is a simple matter while a vehicle is stationary, it is a matter which is most difficult to observe during vehicle movment. Further, a tire problem often occurs only after a vehicle has been in motion for some time. Accordingly, it is desirable to have a method and apparatus which permits a pneumatic tire to be monitored while the vehicle which is supported by the tire is moving.

Several tire pressure and temperature monitoring systems are known in the prior art. Typically the systems utilize a complex wiring technique or utilize specialized transmitter and receivers which require power sources and antennae. Certain simpler monitoring apparatus are known and utilize self-contained pressure monitors which actuate a visible signal on the tire valve stem when the tire pressure is low. However, tire temperature is, more often than not, a more valid indication of imminent tire failure and all of these prior art systems fail to disclose a simple, reliable temperature sensor system which can be utilized with a rotating tire. Such a system could easily detect the increased tire temperature associated with imminent tire failure, or with tread separation in the case of a new or retreaded tire such as those typically utilized by truckers or drivers of other transport vehicles.

SUMMARY OF THE INVENTION

Accordingly, it is one object of the present invention to provide an improved tire monitoring apparatus.

It is another object of the present invention to provide an improved tire monitoring system which monitors the temperature of a rotating tire.

It is yet another object of the present invention to provide an improved tire monitoring method.

It is another object of the present invention to provide an improved tire monitoring system which can be simply and easily installed.

It is yet another object of the present invention to provide an improved tire monitoring system which monitors the temperature of a rotating tire and which provides a highly reliable indication of that temperature.

The foregoing objects are achieved as is now described. A plurality of magnetic studs are embedded into the tread of a pneumatic tire at selected points about the periphery thereof. A magnetic field sensor is mounted upon a non-rotating portion of the vehicle adjacent to the periphery of the tire and is utilized to detect the magnetic field pulsations generated by the rotating plurality of magnetic studs. As the temperature of the tire increases, toward imminent failure or tread separation, the heat generated will decrease the magnetic field associated with the magnetic studs. When the temperature increases to a selected point and the magnetic field decreases accordingly, a display device is utilized to generate a visual and/or audible indication of imminent tire failure.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
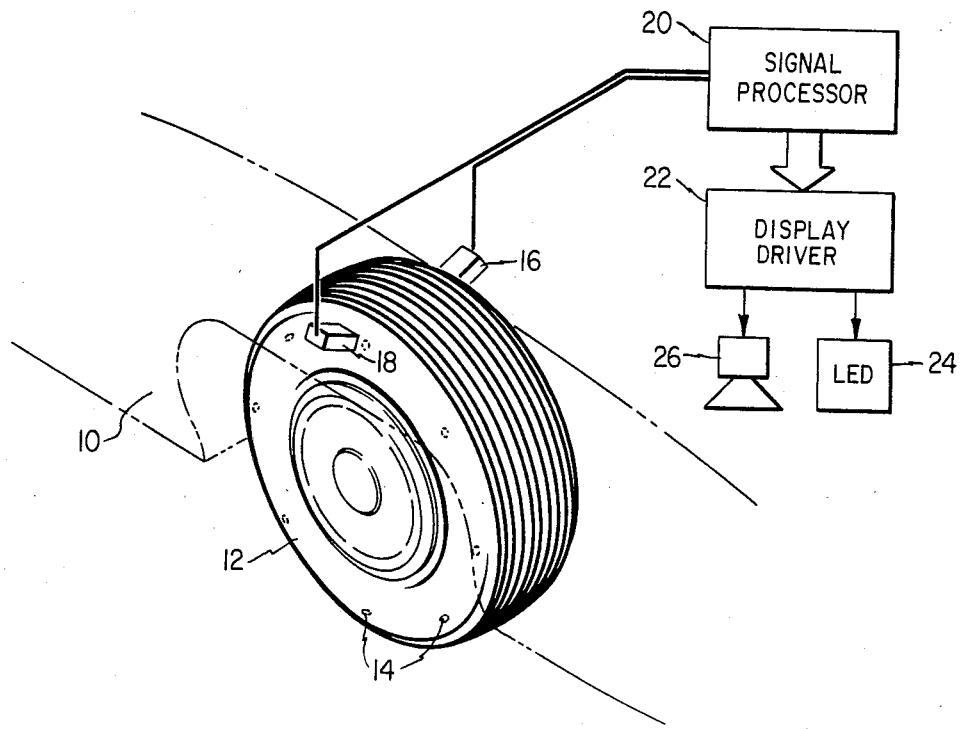
FIG. 1 is a partially diagrammatic and partially schematic view of the magnetic tire monitor system of the present invention.

Referring now the figures, and in particular with reference to FIG. 1, there is depicted a partially diagrammatic and partially schematic view of the magnetic tire monitor system of the present invention. As can be seen, a vehicle portion 10 is depicted having at least one standard pneumatic tire 12 mounted thereon. A plurality of magnetic studs 14 is disposed about the periphery of tire 12 in a manner which will be explained in greater detail herein. In a preferred embodiment of the present invention, a second plurality of magnetic studs (not shown) is disposed around the inward side of tire 12 in a manner similar to that depicted in FIG. 1.

Preferably, a pair of magnetic field sensing devices 16 and 18 are mounted, in any manner well known in the art, near the periphery of tire 12 on a non-rotating portion of vehicle 10. Thus, as pneumatic tire 12 rotates during movement of vehicle 10, the magnetic field generated by each of magnetic studs 14 will pass within the field of regard of magnetic field sensing devices 16 and 18 and will generate a pulsating output signal indicative of that field. Those skilled in the art will appreciate that magnetic field sensing devices 16 and 18 can be simply implemented utilizing any number of suitable sensing devices such as Hall effect devices or magnetic pickup coils.

The output signals of magnetic field sensing devices 16 and 18 are then coupled to signal processor 20 which evaluates these signals to determine the absence/presence and/or strength of the magnetic field detected. A suitable interlock switch can be utilized to ensure that signal processor 20 is only activated during movement of vehicle 10 to prevent the inopportune stationary positioning of tire 12 from being interpreted as an absence of magnetic field.

The imminent failure of tire 12 is then determined by an analysis of this magnetic field by sensing devices 16 and 18. This is accomplished by utilizing the well known fact that heat will decrease the magnetic properties of most materials. Thus, as a portion of tire 12 heats to a selected temperature, indicative of imminent tire or tread failure, the magnetic field generated by magnetic studs 14 in the area of overheating will decrease noticeably. This decrease in magnetic field is analyzed and after the field decreases to a preselected level, an appropriate signal is then coupled to display driver 22. Display driver 22 may be utilized to activate a light-emitting diode display 24 or other visual display and/or an audible alarm 26 contained within vehicle 10. Those skilled in the art will appreciate that it is a simple matter to include multiple light displays in order to utilize a separate display with each of a plurality of tires on a single vehicle.

Figure 2:
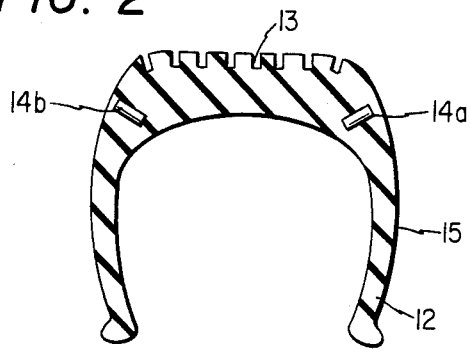
FIG. 2 is a sectional view of a tire showing the magnetic studs utilized with the magnetic tire monitor system of the present invention.

Referring now to FIG. 2, there is depicted a sectional view of tire 12 of FIG. 1. As can be seen, tire 12 includes a sidewall section 15 and a tread section 13. Magnetic studs 14a and 14b are shown to be implanted in the shoulder section of tire 12 between tread section 13 and sidewall section 15. Magnetic studs 14a and 14b comprise, in a preferred embodiment of the present invention, small cylindrical members which can be embedded into the tread at the shoulder section of tire 12 in the same manner in which metal studs are embedded into tires designed for increased traction in mud and snow.

This embedding technique is well known in the tire industry and can be utilized to implant magnetic studs 14a and 14b simply and efficiently into the shoulder area of tire 12.

The location of magnetic studs 14a and 14b, along with the remaining plurality of magnetic studs, is preferably in this shoulder area of tire 12 in order to efficiently detect the increased heat at that point within tire 12 wherein tread separation or tire failure will most likely occur.

Figure 3:
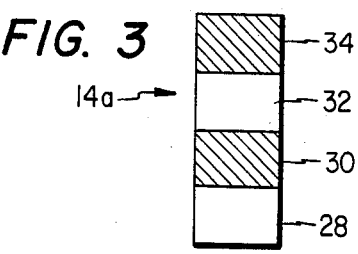
FIG. 3 is a view of a single magnetic stud which can be utilized with the magnetic tire monitor system of the present invention.

Referring now to FIG. 3, there is depicted a view of magnetic stud 14a of FIG. 2 which is useful in describing one possible manner in which magnetic stud 14a may be constructed. The magnetic stud 14a is comprised of a magnetic material selected to have its Curie point at or near the temperature which is to be sensed.

As those skilled in the magnetic art will appreciate, as a material is heated to a temperature near its Curie point, its magnetic properties will be totally diminished. Thus, as magnetic stud 14a is heated the magnetic field will diminish, disappearing at the Curie temperature. Also, as those skilled in the magnetic art will appreciate, combinations of both hard and soft magnetic materials may be used to tailor the magnetic field response to changes in temperature and is illustrated in FIG. 3 as hard magnetic layers 34 and 30, alternately with soft magnetic layers 32 and 28.

Although the invention has been described with reference to a specific embodiment, this description is not meant to be construed in a limiting sense. Various modifications of the disclosed embodiment as well as alternative embodiments of the invention will become apparent to persons skilled in the art upon reference to this description of the invention. It is therefore contemplated that the appended claims will cover any such modifications or embodiments that fall within the true scope of the invention.

What is claimed is:

1. Apparatus for monitoring the condition of a pneumatic tire on a moving vehicle comprising:
   a plurality of magnetic members embedded in the body of a pneumatic tire at selected points about the periphery thereof;
   at least one magnetic field sensing device mounted upon a non-rotating portion of said vehicle in proximity to the periphery of said tire for generating an output signal representative of the magnetic field generated by said plurality of magnetic members;
   signal processing means coupled to said at least one magnetic field sensing device for measuring decreases in said output signal indicative of an increase in temperature of said tire; and
   display means coupled to said signal processing means for generating a visual display signal in response to a selected decrease in said output signal.

2. The apparatus for monitoring the condition of a pneumatic tire on a moving vehicle according to claim 1 wherein said plurality of magnetic members comprises a plurality of cylindrical magnetic studs.

3. The apparatus for monitoring the condition of a pneumatic tire on a moving vehicle according to claim 2 wherein said plurality of cylindrical magnetic studs comprises a plurality of cylindrical studs constructed of a hard magnetic material.

4. The apparatus for monitoring the condition of a pneumatic tire on a moving vehicle according to claim 1 wherein said plurality of said magnetic members are embedded in the shoulder portion of said pneumatic tire.

5. The apparatus for monitoring the condition of a pneumatic tire on a moving vehicle according to claim 4 wherein said plurality of magnetic members are embedded at substantially equidistant points about the periphery of said tire.

6. The apparatus for monitoring the condition of a pneumatic tire on a moving vehicle according to claim 1 wherein said at least one magnetic field sensing device comprises a Hall effect device.

7. The apparatus for monitoring the condition of a pneumatic tire on a moving vehicle according to claim 1 wherein said signal processing means comprises means for comparing said output signal with a predetermined signal level.

8. The apparatus for monitoring the condition of a pneumatic tire on a moving vehicle according to claim 1 wherein said display means is mounted within said vehicle.

9. The apparatus for monitoring the condition of a pneumatic tire on a moving vehicle according to claim 1 wherein said display means further includes means for generating an audible signal.

10. The apparatus for monitoring the condition of a pneumatic tire on a moving vehicle according to claim 8 wherein said display means includes a light emitting diode.

11. The apparatus for monitoring the condition of a pneumatic tire on a moving vehicle according to claim 1 wherein said vehicle includes a plurality of pneumatic tires.

12. The apparatus for monitoring the condition of a pneumatic tire on a moving vehicle according to claim 11 wherein said apparatus includes a plurality of magnetic members embedded in the body of each of said plurality of pneumatic tires.

13. The apparatus for monitoring the condition of a pneumatic tire on a moving vehicle according to claim 12 wherein said apparatus includes a plurality of display means, each of said plurality of display means associated with a single one of said of plurality of pneumatic tires.

14. Apparatus for monitoring the condition of a pneumatic tire on a moving vehicle comprising:
- a plurality of magnetic members embedded in the body of a pneumatic tire at selected points about the periphery thereof;
- at least one magnetic field sensing device mounted upon a non-rotating portion of said vehicle in proximity to the periphery of said tire for generating an output signal representative of the magnetic field generated by said plurality of magnetic members; and
- means for generating a visual signal in response to a selected decrease in said output signal corresponding to a selected increase in the temperature of said tire.

15. The apparatus for monitoring the condition of a pneumatic tire on a moving vehicle according to claim 14 wherein said plurality of magnetic members comprises a plurality of cylindrical magnetic studs.

16. The apparatus for monitoring the condition of a pneumatic tire on a moving vehicle according to claim 15 wherein said plurality of cylindrical magnetic studs comprises a plurality of cylindrical studs constructed of a hard magnetic material.

17. The apparatus for monitoring the condition of a pneumatic tire on a moving vehicle according to claim 14 wherein said plurality of said magnetic members are embedded in the shoulder portion of said pneumatic tire.

18. The apparatus for monitoring the condition of a pneumatic tire on a moving vehicle according to claim 17 wherein said plurality of magnetic members are embedded at substantially equidistant points about the periphery of said tire.

19. The apparatus for monitoring the condition of a pneumatic tire on a moving vehicle according to claim 14 wherein said at least one magnetic field sensing device comprises a Hall effect device.

20. The apparatus for monitoring the condition of a pneumatic tire on a moving vehicle according to claim 14 wherein said vehicle includes a plurality of pneumatic tires.

21. The apparatus for monitoring the condition of a pneumatic tire on a moving vehicle according to claim 19 wherein said apparatus includes a plurality of magnetic members embedded in the body of each of said plurality of pneumatic tires.

22. The apparatus for monitoring the condition of a pneumatic tire on a moving vehicle according to claim 14 wherein said apparatus includes a means associated with each of said plurality of pneumatic tires for generating a visual signal in response to a selected decrease in said output signal.

23. A method for monitoring the condition of a pneumatic tire on a moving vehicle comprising:
- embedding a plurality of magnetic members in the body of a pneumatic tire at selected points about the periphery thereof;
- sensing the magnetic field generated by said plurality of magnetic members during rotation of said tire; and
- generating a visual signal in response to a selected decrease in said magnetic field corresponding to a selected increase of temperature of said tire.

* * * * *